Figure 1:
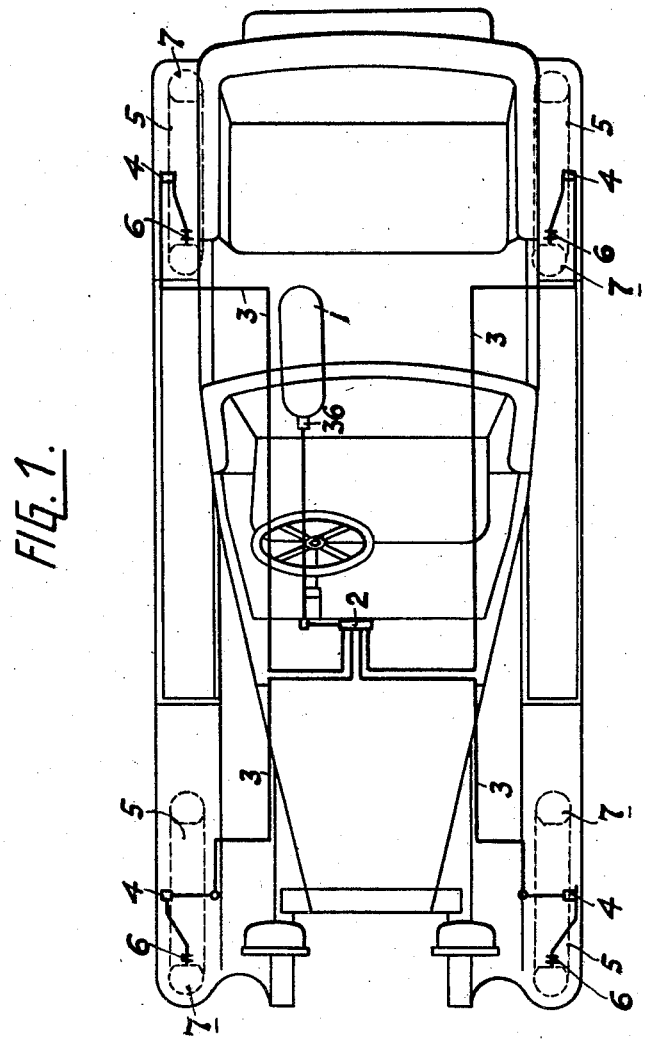

March 17, 1931. K. SCHMIDT 1,796,482
ART OF INFLATING TIRES
Filed Sept. 7, 1926 4 Sheets-Sheet 1

Inventor:
Kurt Schmidt

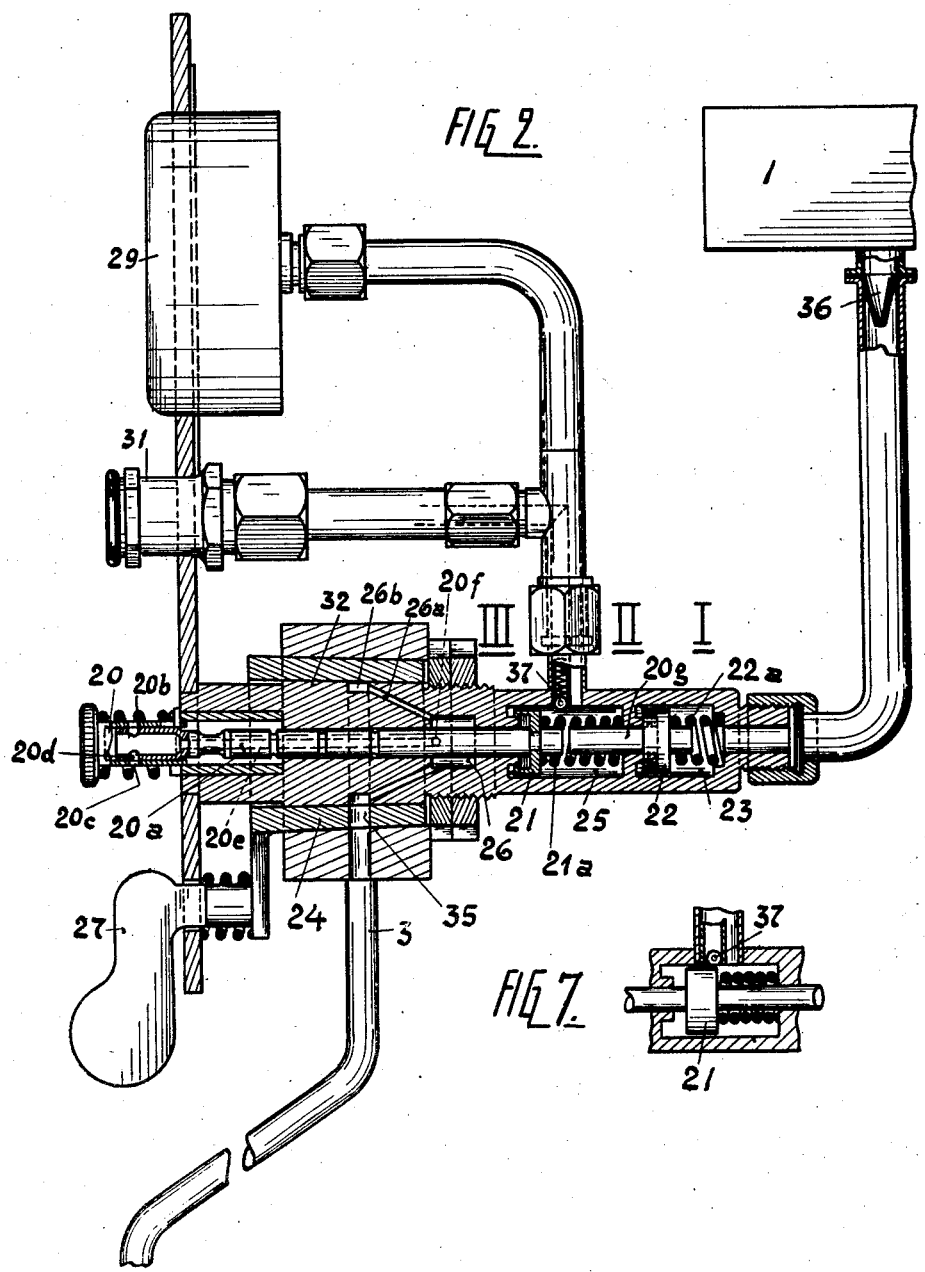

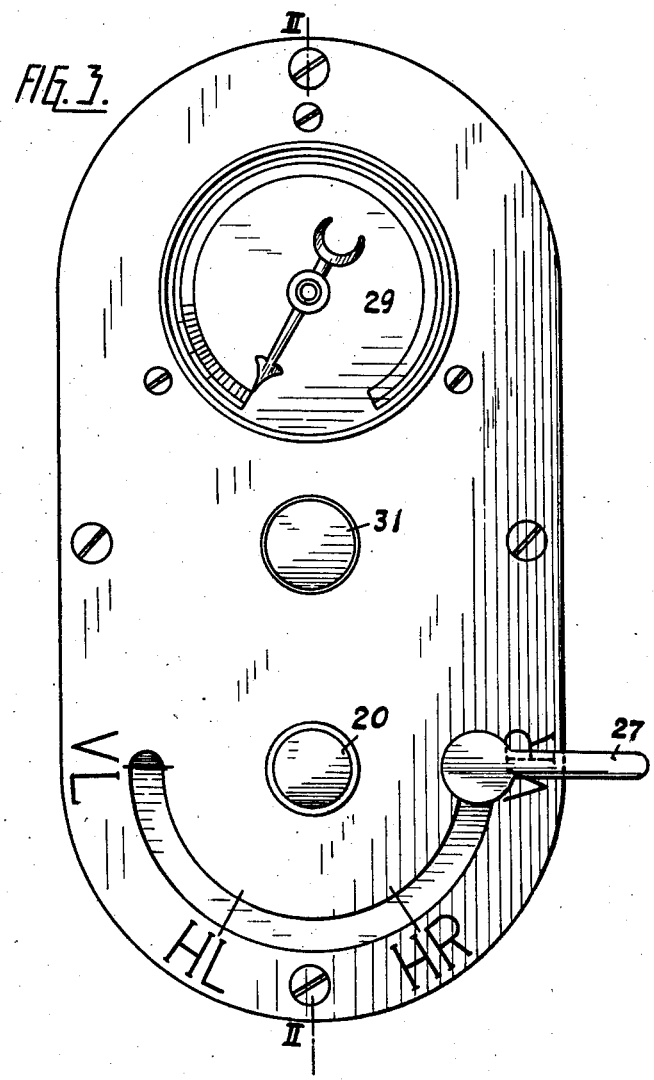

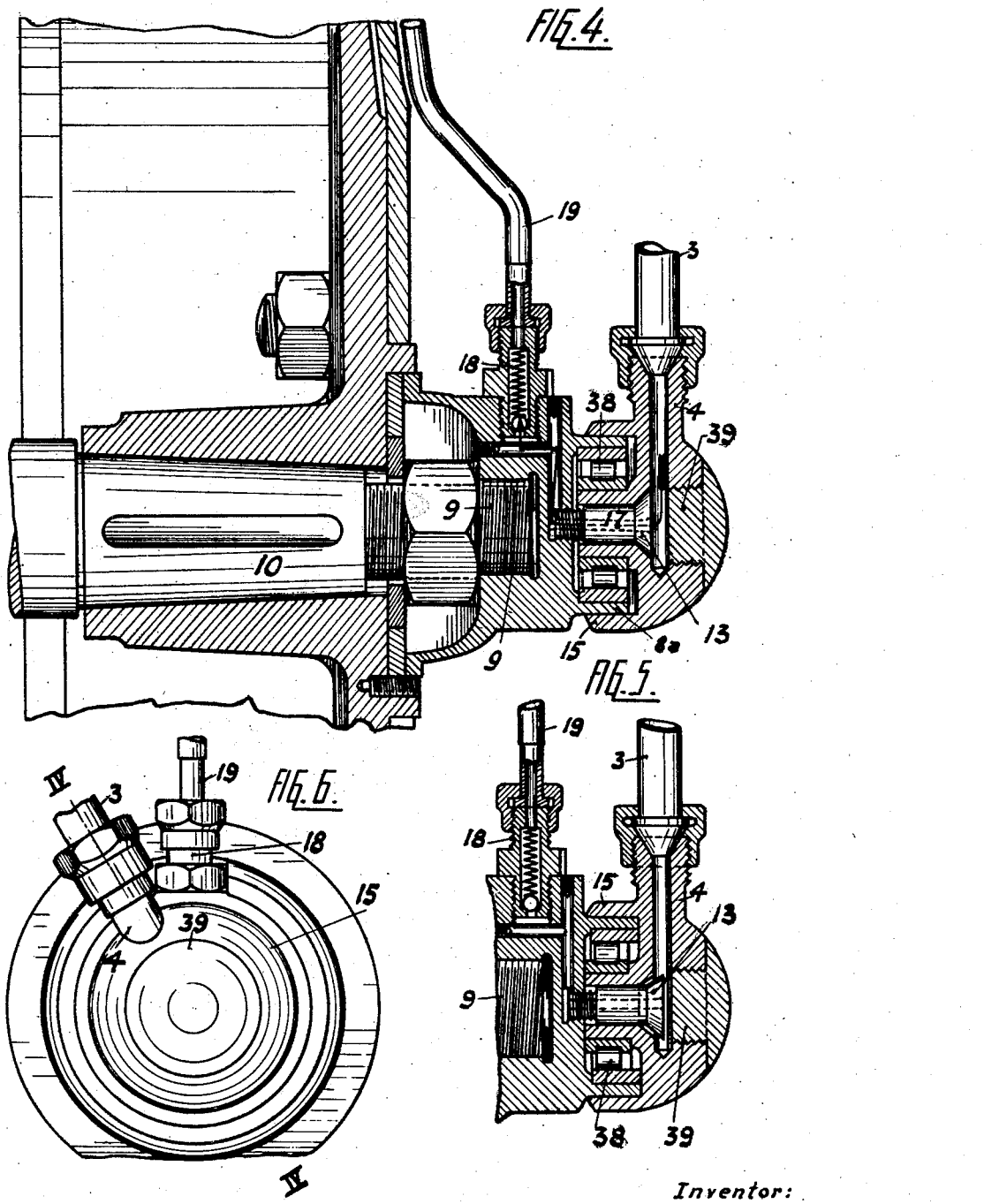

Patented Mar. 17, 1931

1,796,482

UNITED STATES PATENT OFFICE

KURT SCHMIDT, OF WERNIGERODE, GERMANY

ART OF INFLATING TIRES

Application filed September 7, 1926, Serial No. 134,072, and in Germany September 8, 1925.

This invention refers broadly to improvements in the art of inflating tires, particularly during the movement of the vehicle and more generally to the conveying of pressure fluids and liquids from a central distributing point or the like to different points and parts of a vehicle. With these and other objects in view the invention refers to means for investigating the condition of pneumatic tires and the like and inflating the same during the operation of the vehicle, particularly of automobiles.

In accordance with the invention to be described the pressure fluid or liquid, such as compressed air is first caused to pass from a pressure container, compressor, receptacle, pressure bottle or the like to a distributor to which all the pipe conduits leading to the wheel axles are connected, and which is provided with a pressure gauge 29, and with a plurality of valves in such a manner that it becomes possible to examine the pressure in the connected tubes or tires by a mere operation of the valves, and to inflate said tubes and to measure the pressure in the pressure container.

The invention will be more fully and particularly described with reference to the accompanying drawings showing by way of exemplification a form of embodiment of the principles of this invention.

Fig. 1 illustrates diagrammatically the entire arrangement of the device in accordance with this invention in plan view and as applied to an automobile. Fig. 2 is a representation of the distributor in longitudinal section on the line II—II of Figure 3 and Figure 3 is a front view of the device according to Figure 2. Fig. 4 is a longitudinal section on the line IV—IV in Figure 6 through the rear axle with the conduits connected thereto and leading to the compressed air container and with the conduits for the air tube, the parts being shown in the position which they assume during the inflation of an air tire. Figure 5 is a similar longitudinal section, but with different parts in the position which they assume, when not in operation. Figure 6 is a front view according to Figure 5. Figure 7 shows a part of the device represented in Figure 2 and on an enlarged scale.

The air required for the inflation of the tire is admitted from an air compressor or from an air tank 1, and is conducted therefrom and by way of a nozzle 36 which serves as throttling means to a distributor (Fig. 2) which may be secured to the switch board of the vehicle. This distributor which will be more particularly described hereinafter communicates with the pressure gauge 29. In consequence of the arrangement of a plurality of valves it becomes possible to examine the pressure in the air tank as well as in the tubings connected thereto and to admit that pressure to the several tubes and to feed them with air according to requirements. The conveying of the air from the relatively stationary admission conduits 3 to the rotating wheels is effected by intermediate members 4 (Figs. 4 to 6) which will also be more fully described hereinafter.

In the case of the rear wheels there is an intermediate member 4 which is connected at the outside of the wheel to the wheel axle box 8 and is rigidly connected to the somewhat elastic admission conduit 3. From the intermediate member 4 conduits lead to the tube valves 6.

The distributor, shown in Figures 2, 3, 7 carries a casing 32. In this casing the collecting chamber 23 is arranged which is fed by means of the nozzle 36 from the air tank 1. To the collecting chamber 23 the pressure testing chamber 25 is connected. Between the chambers 23 and 25 a valve 22 is disposed which is acted upon by the spring 22a. The pressure testing chamber 25 communicates with the preliminary chamber 26 for the tube, the said chamber 26 being adapted for connection with the wheel tires by means of the conduits 3. The selective connection of the chamber 26 with one of the pipe conduits 3 is effected by the rotation of the ring 24 surrounding the casing 32 on the axis of the casing and by means of the handle 27, so that the opening 35 provided in the ring 24 will connect the passages or ports 26a, starting from the chamber 26 and terminating in the annular channel 26b, with one of the conduits 3.

Between the chambers 25 and 26 the valve 21 is disposed which is acted upon by the spring 21a. From the casing 32 the controlling button 20 projects which is guided for longitudinal displacement along the valve rod 20a and which is retained in its outer extreme position by the spring 20b. By forcing this knob or button 20 inwards the opening 20c is first moved out of registration with the opening 20d of the valve rod 20a, which latter communicates with the preliminary chamber 26 by the longitudinal passage 20e and the transverse bore 20f. Thereafter the knob 20 abuts against the front surface of the valve rod 20a, so that the knob will now open the valve 21 and thereafter the valve 22. The valve rod 20g of the latter in the position of rest of the parts terminates at a certain distance from the end of the valve rod 20a of the valve 21. The air is now free to flow from the collecting chamber 23 into the testing chamber 25, thence into the preliminary chamber 26 and from the latter into any one of the conduits 3.

The pressure in the collecting chamber 23 is normally equal to the pressure in the tank 1 since if sufficient time is available a complete filling of the collecting chamber takes place notwithstanding the nozzle 36. After opening the valves 21 and 22 the compressed air content of the collecting chamber 23 which is subjected to high pressure is distributed over the remaining part of the total space which was hitherto subjected to lower pressure. The total space comprises the collecting chamber 23, testing chamber 25, preliminary chamber 26 and conduit 3. The volume of the collecting chamber is in such ratio to the capacity of the total space that the pressure which arises after opening the valves 21 and 22 is sufficient to open the valve 6 of the air tube. After opening the valve 6 the pressure of the comparatively small quantity of air contained in the total space and the pressure of the comparatively large quantity of air contained in the tube are equalized to form a total pressure which only exceeds to a practically immeasurable extent the pressure which previously prevailed in the tube. The valves 21, 22 remain open only a short time during the above described operation, which merely serves for testing the interior pressure of the tube. During this short period, the supply of air from the compressed air tank 1 to the above-mentioned total space is only very small since the supply of air through the nozzle 36 is throttled.

The pressure gauge 29 connected to the testing chamber 25 indicates the pressure prevailing in the total space referred to shortly before the opening of the valve 6, and after the opening of the valve 6 and the equalization of the pressures in the distributor and the tube has occurred it indicates the pressure prevailing in the tube. The reading off of the interior pressure in the tube on the pressure gauge may be effected before or after release of the knob or button 20, and even after the release of the knob in view of the fact that the pressure remains unchanged in the testing chamber 25 after the closing of the valve 21, 22, though this operation is effected simultaneously with the establishing of the communication between the preliminary chamber 26 and the atmosphere.

The preliminary chamber 26, however, is emptied again by establishing the communication with the atmosphere, so that atmospheric pressure prevails therein and the communication referred to is effected by causing the openings 20c and 20d to be again caused to register after the release of the knob 20, and in view thereof the compressed air contained in the preliminary chamber 26 is free to be discharged through the channels 20f, 20e, 20d and 20c. In consequence of the emptying of the preliminary chamber the tube valve is closed by the action of the interior pressure in the tube. The collecting chamber 23 after the closing of the valves is slowly filled up again from the container 1 and through the nozzle 36.

By means of the arrangement above described it is possible to ascertain at any time and even during the operation of the vehicle, what pressure prevails in each of the tubes. If it is desired to fill the tube or tire, the knob 20 is kept depressed, until the pressure gauge indicates the desired pressure. The compressed air will then flow from the compressed air container 1 by way of the throttling nozzle 36, the distributor and the connecting pipe 3 to the particular tube or tire connected to the distributor. The knob 20 may also be provided with any suitable locking means to be able to temporarily lock it in the depressed position.

As illustrated in Fig. 2, an excess pressure or overpressure valve 31 is connected to the testing chamber 25 in order to prevent overloading of the tire to be filled. This overpressure valve 31 should be adjusted to the prescribed pressure of the tire. In order to prevent the overpressure valve 31 from being opened by the action of the pressure serving for the opening of the tire valve 6 and exceeding the normal tire pressure, so that the overpressure required for the pushing open of the tire valve will be immediately allowed to escape, the overpressure valve 31 is connected to a preliminary valve 37. This preliminary valve in front of the valve 31 comprises a ball 37 (Fig. 7) which is under a spring pressure of such force that it will not be lifted off its seat when acted upon by the opening pressure for the tire valve above referred to.

In connection with the above-described testing of the interior pressure of the tube, the valve 21 and also the valve 22 is only slightly depressed by the knob 20 and only to such a small extent that the valve 21 merely abuts against the back pressure valve 37 without opening this valve. Since the valve 37 still remains closed, the communication between the testing chamber 25 and the overpressure valve 31 is not yet established so that the air contained in the testing chamber 25, which is subjected until the opening of the tube valve to a higher pressure than the normal interior pressure of the tube, cannot pass away out of the overpressure valve 31. Such outflow of air would prevent an opening of the tube valve.

When after the testing of the tube pressure the tube is to be filled, the knob 20 is more forcibly pushed inwards, so that the valve 21 upon its way causes the ball of the preliminary valve 37 to be lifted off its seat and establishes communication with the overpressure valve 31. Inasmuch as the ball 37, as already stated, is loaded by a strong spring, the operator using the device will encounter a certain increased resistance by the abutting of the valve 21 against the ball, so that the position of the knob 20 required for the testing of the tube pressure cannot be exceeded by mistake.

For the purpose of testing the pressure in the container 1 the lever 27 is moved into an intermediate position in which the opening 35 will not communicate with any of the pipe conduits 3. Thereupon the knob 20 is forced into the testing position and the pressure is read off on the gauge 29, after the gauge has assumed its position of rest, the preliminary valve 37 being retained in the closed position.

The connection of the relatively stationary pressure conduits 3 to a rear wheel is shown by way of example in Figures 4 to 6 of the drawing. The wheel axle box 8 is screw-threadedly secured upon the threaded stud 9 of the cone 10 of the axle. The wheel box 8 is provided with an annular flange 8a within which by means of the roller bearing 38 the intermediate member 4 is guided which surrounds the annular flange 8a of the wheel box 8 by means of a corresponding annular flange 15.

The tightening stud 13 is of conical shape at its end and is screw-threadedly secured in the wheel box 8. It cooperates with a conical tightening face of the intermediate member 4. The length of the stud 13 is so determined as to correspond to the extent of the turned off portion of the intermediate member 4 confined by the flange 15 and in such a manner that the intermediate member 4 is free to perform a certain movement in the axial direction, by means of which the conical surfaces of the intermediate member and of the stud 13 are brought into and out of contact with each other. The intermediate member 4 is connected by the conduit 3 to the distributor 2 (Fig. 1). The air entering through said conduit flows from the intermediate member 4 into the bore 17 of the tightening stud 13 and thence through passages in the wheel axle and the conduit 19 into the tube 7. In lieu of the valve 6 in the valve stem of the inner tubes, a valve 18 may be inserted at the junction of the conduit 19 and the hub. Before the air is admitted to the intermediate member 4, the tightening stud 13 is still in the position according to Figure 5, that is to say, in the position lifted off from its seat. As soon as the air is admitted to the intermediate member 4, this member is forced outwards into the tightening position according to Figure 4. In order to make possible this displacement of the intermediate member 4, the conduit 3 is either made yieldable itself or it is provided with a flexible or with a link-shaped portion. As soon as the admission of compressed air from the distributor has ceased and the conduit 3 has been emptied by the emptying of the distributor, the tightening surfaces are separated from each other, that is to say, they will again assume the position shown in Figure 5. During the movement of the vehicle there will therefore be no contact between the tightening surfaces in most cases, so that there will be no wear of the parts. These tightening surfaces will only be in contact with each other during the short time of the actual inflation or of the testing of the air pressure. The guiding of the contacting surfaces upon each other and away from each other may be aided by special springs.

The bore provided in the intermediate piece 4 and closed by the screw 39 provides for easy accessibility to the tightening stud 13, so that the latter may be conveniently inspected and exchanged.

It should be understood that the invention is in no manner limited to the particular form of exemplification herein shown and described merely by way of illustration of its principles, but it may find expression in other embodiments, and modifications and changes may be made in the construction and arrangement of parts, and without deviating from the scope and spirit of the invention, except as otherwise stated in the appended claims.

I claim:—

1. An apparatus of the class described comprising in combination, a source of fluid under pressure, a plurality of inflatable tires, a distributing valve, a conduit connecting said valve to said source, a throttling nozzle interposed in said conduit, a plurality of conduits connecting said valve to said tires, a chamber interposed in the conduit between said valve and said source, a second valve interposed between said source and said chamber, a pressure indicator communicating with said chamber, and means for selectively positioning said distributing valve to establish communication between said chamber and any one of said tires.

2. An apparatus of the class described comprising in combination, a source of fluid under pressure, a plurality of inflatable tires, a distributing valve, a conduit connecting said valve to said source, a throttling nozzle interposed in said conduit, a plurality of conduits connecting said valve to said tires, a chamber interposed in the conduit between said valve and said source, a pressure indicator communicating with said chamber, valve means associated with said chamber for establishing communication between said chamber and said distributing valve, and a second valve means for establishing communication between said chamber and said source.

3. An apparatus of the class described comprising in combination, a source of fluid under pressure, a plurality of inflatable tires, a distributing valve, a conduit connecting said valve to said source, a throttling nozzle interposed in said conduit, a purality of conduits connecting said valve to said tires, a chamber interposed in the conduit between said valve and said source, a pressure indicator communicating with said chamber, a pair of check valves associated with said chamber, and means when in one position actuating one of said check valve to establish communication between said distributing valve and said chamber and when in another position actuating both of said check valves to establish communication between said source, said chamber and said distributing valve.

4. An apparatus of the class described comprising in combination, a source of fluid under pressure, a plurality of inflatable tires, a distributing valve, a conduit connecting said valve to said source, a throttling nozzle interposed in said conduit, a plurality of conduits connecting said valve to said tires, a chamber interposed in the conduit between said valve and said source, a pressure indicator communicating with said chamber, a pair of check valves associated with said chamber, and a push rod for actuating one of said check valves to establish communication between said distributing valve and said chamber and upon further movement of said rod to establish communication between said source, said chamber and said distributing valve.

5. An apparatus of the class described comprising in combination, a source of fluid under pressure, a plurality of inflatable tires, a distributing valve, a conduit connecting said valve to said source, a throttling nozzle interposed in said conduit, a plurality of conduits connecting said valve to said tires, means connected to said distributing valve and responsive to a predetermined pressure within the distributing valve to permit escape of the fluid to the atmosphere, and means for selectively positioning said valve to establish communication between said source and any one of said tires.

6. In an apparatus as claimed in claim 4, said push rod being provided with a longitudinal bore, and valve means associated with said bore to permit communication between said distributing valve and the atmosphere.

7. In an apparatus as claimed in claim 5, said responsive means being provided with a check valve, and means for opening said valve to establish communication between the responsive means and said distributing valve.

In testimony whereof I affix my signature.
KURT SCHMIDT